(12) United States Patent
Adachi

(10) Patent No.: US 11,573,447 B2
(45) Date of Patent: Feb. 7, 2023

(54) DISPLAY DEVICE

(71) Applicant: Japan Display Inc., Tokyo (JP)

(72) Inventor: Koichiro Adachi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/549,393

(22) Filed: Dec. 13, 2021

(65) Prior Publication Data

US 2022/0100029 A1 Mar. 31, 2022

Related U.S. Application Data

(63) Continuation of application No. 16/797,739, filed on Feb. 21, 2020, now Pat. No. 11,199,738.

(30) Foreign Application Priority Data

Feb. 27, 2019 (JP) .............................. JP2019-034660

(51) Int. Cl.
*G02F 1/1335* (2006.01)
*G02F 1/1339* (2006.01)

(52) U.S. Cl.
CPC ...... *G02F 1/133512* (2013.01); *G02F 1/1339* (2013.01); *G02F 1/133514* (2013.01); *G02F 1/133528* (2013.01)

(58) Field of Classification Search
CPC ................................................ G02F 1/133512
See application file for complete search history.

(56) References Cited

U.S. PATENT DOCUMENTS

| 2011/0242469 A1* | 10/2011 | Kawamura ....... G02F 1/133512 349/138 |
| 2015/0364396 A1* | 12/2015 | Asai .................... G02F 1/13454 257/43 |
| 2016/0062191 A1 | 3/2016 | Matsushima et al. |
| 2016/0363809 A1 | 12/2016 | Kesho |

(Continued)

FOREIGN PATENT DOCUMENTS

| JP | 53-147743 | 11/1978 |
| JP | 61-032087 | 2/1986 |
| JP | 63-240525 | 10/1988 |

(Continued)

OTHER PUBLICATIONS

Japanese Office Action dated Jun. 28, 2022 in corresponding Japanese Application No. 2019-034660.

(Continued)

*Primary Examiner* — Edmond C Lau
(74) *Attorney, Agent, or Firm* — K&L Gates LLP

(57) ABSTRACT

A display device is provided and includes first display area including first pixel; second display area including second pixels and provided next to first display area; light shield surrounding first and second display areas separately, first slit provided in light shield, first sealant surrounding first and second display areas; and second sealant located between first and second display areas, wherein second sealant comprises at least one opening which communicates first and second display areas to each other, and first slit is provided along outer circumference of first display area and outer circumference of second display area, and overlaps base end of second sealant which is connected with first sealant.

11 Claims, 11 Drawing Sheets

(56) References Cited

U.S. PATENT DOCUMENTS

2017/0351152 A1    12/2017    Hashiguchi et al.

FOREIGN PATENT DOCUMENTS

| JP | 2002-049057   | 2/2002  |
|----|---------------|---------|
| JP | 2009-222974   | 10/2009 |
| JP | 2011-170134   | 9/2011  |
| JP | 2011215402 A  | 10/2011 |
| JP | 2016048276 A  | 4/2016  |
| JP | 6080316 B2    | 2/2017  |

OTHER PUBLICATIONS

Japanese Office Action dated Sep. 6, 2022 in corresponding Japanese Application No. 2019-034660.
Chinese Office Action issued Oct. 10, 2022 in corresponding Chinese Application No. 202010121946.3.

* cited by examiner

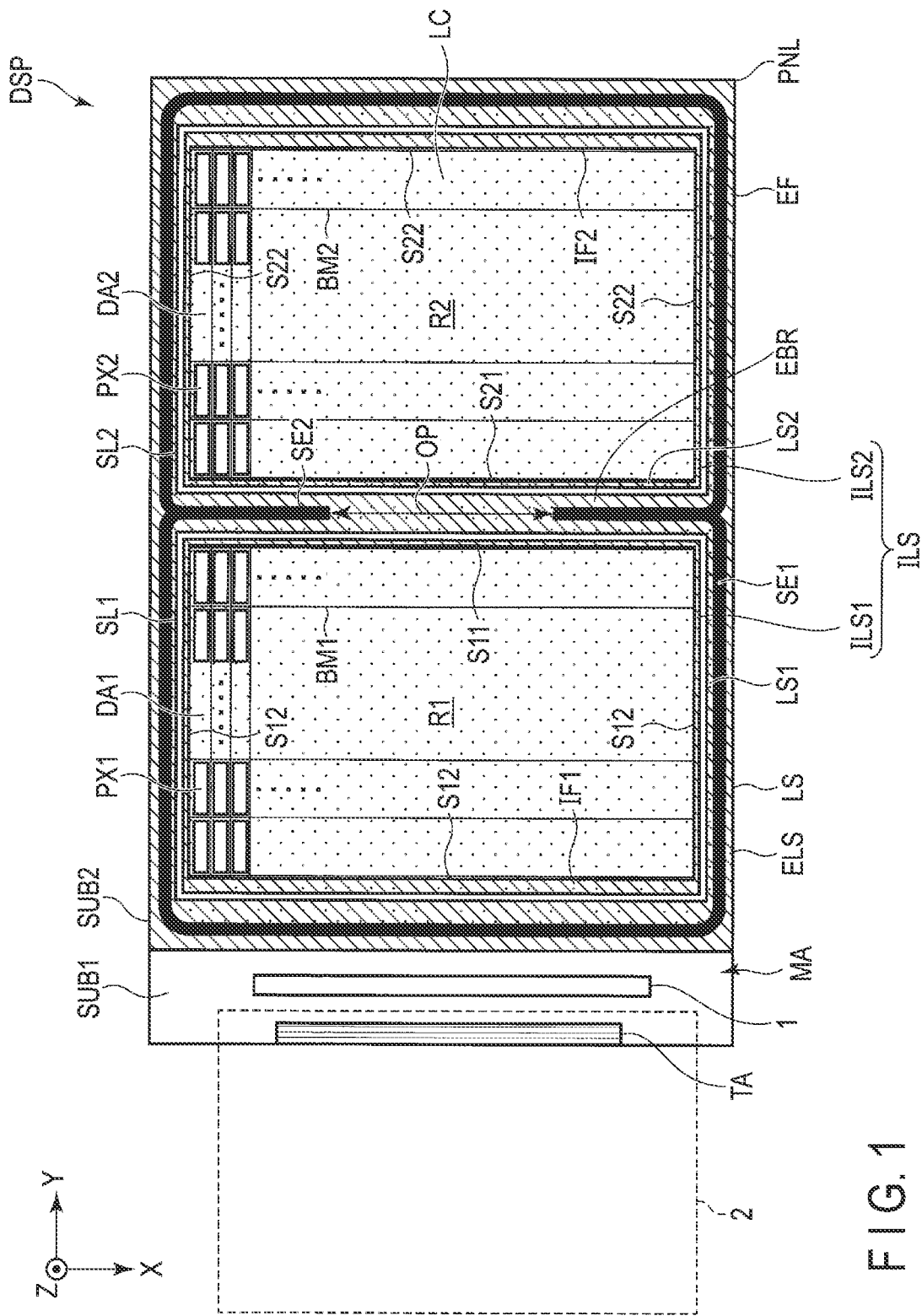
F I G. 1

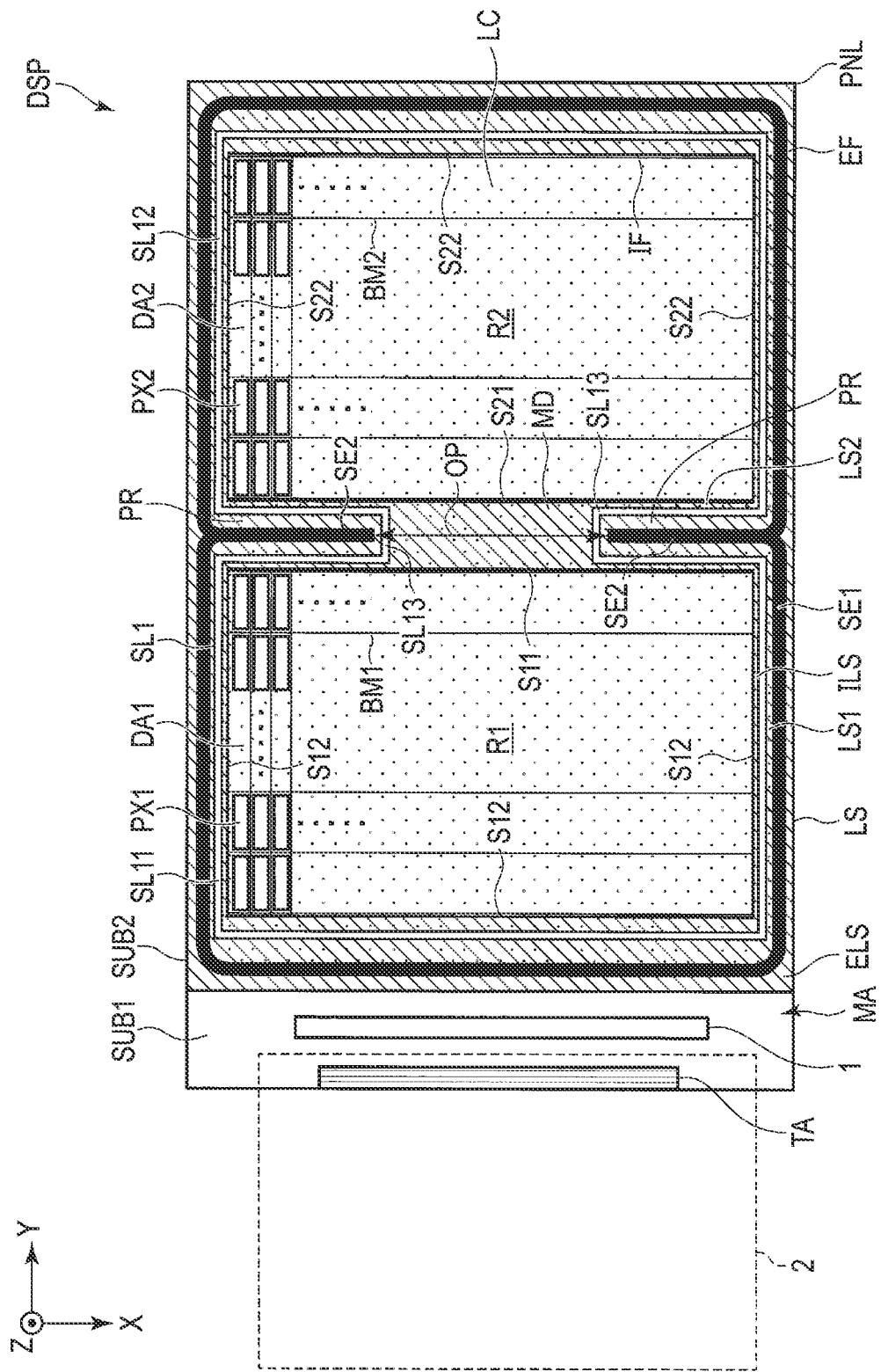
F I G. 2

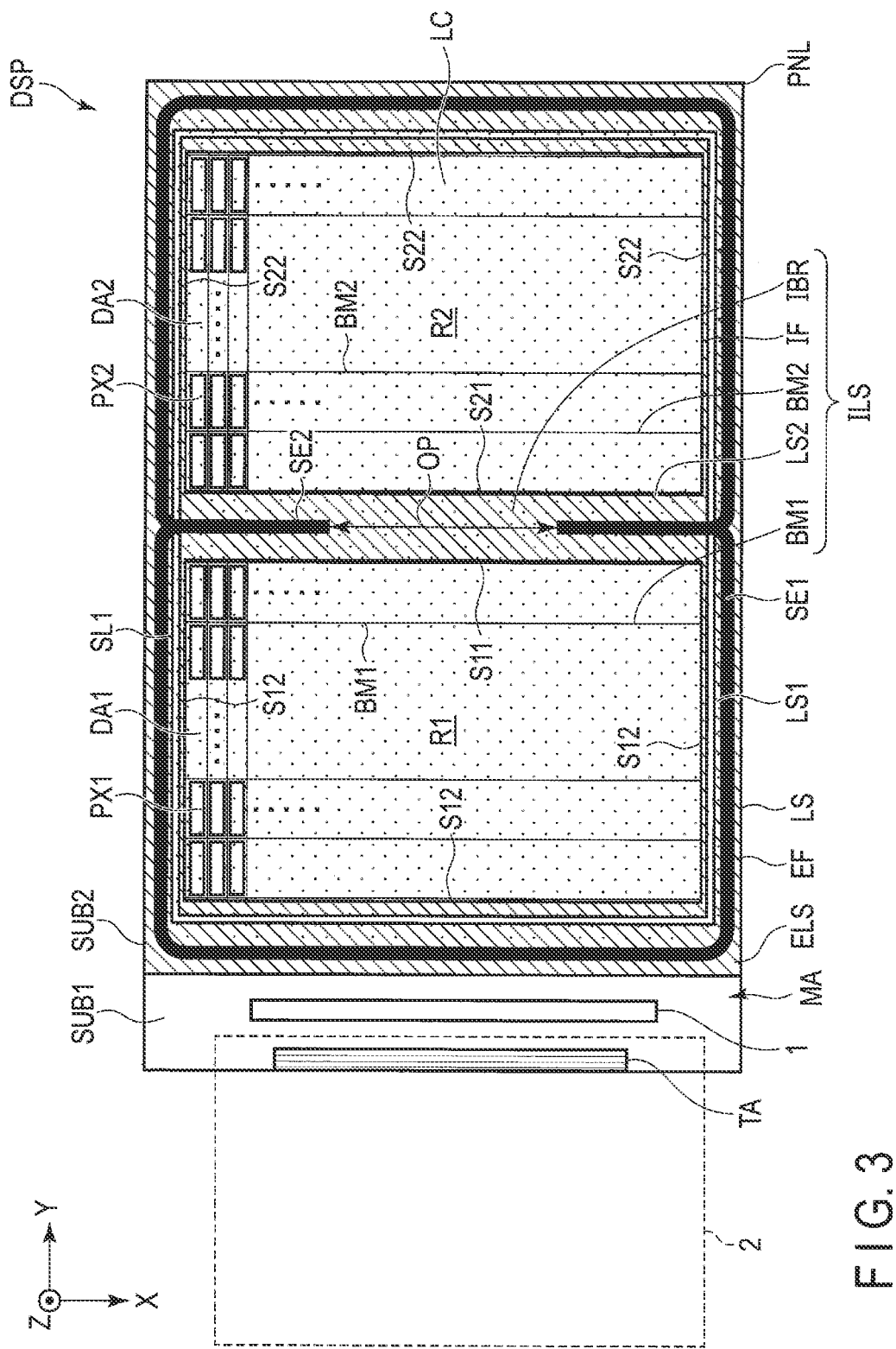
F I G. 3

F.I.G. 6

DISPLAY DEVICE

CROSS-REFERENCE TO RELATED APPLICATIONS

This application is a continuation of U.S. patent application Ser. No. 16/797,739, filed Feb. 21, 2020, which claims the benefit of priority from Japanese Patent Application No. 2019-034660, filed Feb. 27, 2019, the entire contents of which are incorporated herein by reference.

FIELD

Embodiments described herein relate generally to a display device.

BACKGROUND

In recent years, a display device comprising a plurality of display areas on the same substrate has been proposed. Each of the display areas is provided with a light shield. The light shield has conductivity, so the display area may be charged through the light shield by applying an unexpected electric charge from an outside of the display device. That may cause various defects, which result in deteriorating the display quality.

BRIEF DESCRIPTION OF THE DRAWINGS

FIG. 1 is a plan view showing a configuration example of a display device of an embodiment.

FIG. 2 is a plan view showing a first modified example of the display device.

FIG. 3 is a plan view showing a second modified example of the display device.

SUMMARY

Figure 4:
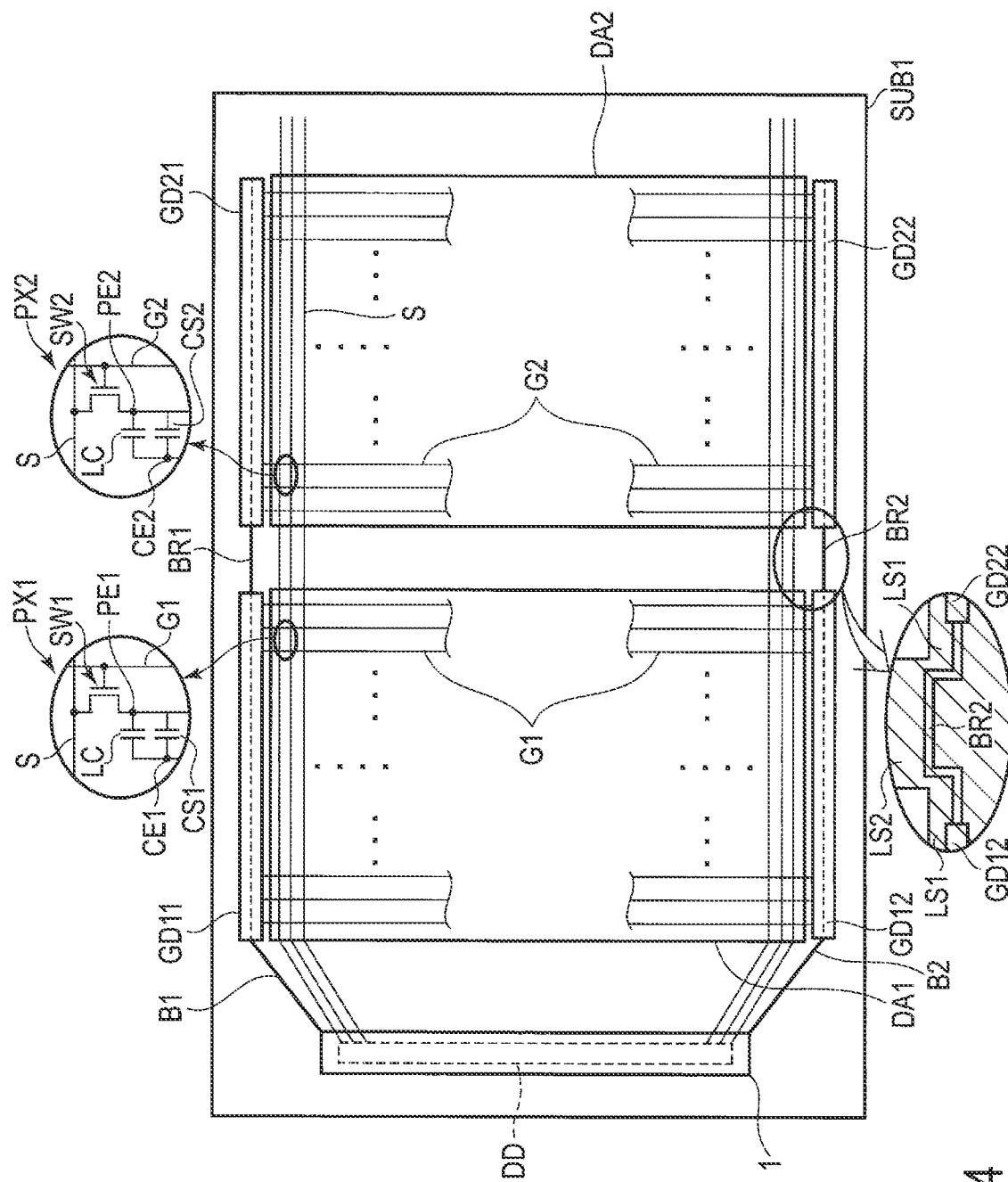
FIG. 4 is a diagram illustrating a main structure of a first substrate.

The present application relates to a display device.

According to one embodiment, a display device includes a first display area in which a first pixel is provided, a second display area provided next to the first display area, in which a second pixel is provided and a light shield surrounding the first display area and the second display area separately, and the light shield includes a first slit surrounding at least one of the first display area and the second display area.

DETAILED DESCRIPTION

In general, according to one embodiment, a display device comprises a first display area in which a first pixel is provided, a second display area, in which a second pixel is provided, provided next to the first display area, and a light shield surrounding the first display area and the second display area separately, and the light shield includes a first slit surrounding at least one of the first display area and the second display area.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and an overlapping detailed description thereof may be omitted unless otherwise necessary.

FIG. 1 is a plan view showing a configuration example of a display device DSP of an embodiment. In this embodiment, a liquid crystal display device is will be as an example of the display device.

The display device DSP comprises a display panel PNL and an IC chip 1. Here, for the sake of convenience, a direction along short edges of the display panel PNL is defined as the first direction X, a direction along long edges of the display panel PNL is defined as the second direction Y, and a thickness direction of the display panel PNL is defined as the third direction Z. For example, the first direction X, the second direction Y and the third direction Z are orthogonal to each other but may intersect at an angle other than ninety degrees.

The display panel PNL comprises a first display area DA1 and a second display area DA2, which display images, and a light shield LS. The first display area DA1 and the second display area DA2 are arranged along the second direction Y. In the first display area DA1, a plurality of first pixels PX1 are provided, and in the second display area DA2, a plurality of second pixels PX2 are provided. The first pixels PX1 and second pixels PX2 are arrayed in a matrix along the first direction X and the second direction Y. The configuration of the first pixels PX1 and the second pixels PX2 will be described later. In the example illustrated in FIG. 1, each of the first display area DA1 and the second display area DA2 is formed quadrangular, but a quadrangular structure with rounded corners or such a structure that a portion of an edge is recessed towards the center can be employed as well. The structure may be some other polygonal, circular or elliptical.

The light shield LS is indicated by slash lines. The light shield LS includes a first light shield LS1 which surrounds the first display area DA1 and the second display area DA2 together, and a second light shield LS2 provided between the first display area DA1 and the second display area DA2. The second light shield LS2 is connected with the first light shield LS1. In the example illustrated in FIG. 1, the first light shield LS1 is formed into a frame shape along an outer periphery of the display panel PNL. Moreover, the second light shield LS2 is formed to extend linearly along the first direction X between the first display area DA1 and the second display area DA2. The first display area DA1 and the second display area DA2 are defined by the first light shield LS1 and the second light shield LS2, respectively.

The light shield LS comprises a first slit SL1 surrounding the first display area DA1 and a second slit SL2 surrounding the second display area DA2. The second slit SL2 is separated away from the first slit SL1. The first slit SL1 and the second slit SL2 are formed respectively in the first light shield LS1 and the second light shield LS2 and they are each formed into a rectangular shape.

The display panel PNL comprises a first substrate SUB1, a second substrate SUB2, a liquid crystal layer LC, a first sealant SE1, and second sealant SE2. The first substrate SUB1 and the second substrate SUB2 overlap each other along the third direction Z. The light shield LS is provided on the second substrate SUB2. The liquid crystal layer LC includes a liquid crystal material containing liquid crystal molecules, and held between the first substrate SUB1 and the second substrate SUB2, and is provided in the first display area DA1 and the second display area DA2. A cell gap between the first substrate SUB1 and the second substrate SUB2 is formed from a spacer provided in each of the first display area DA1 and the second display area DA2. The first sealant SE1 and the second sealant SE2 each contain fillers (spacers in sealant) which maintain the cell gap.

The first sealant SE1 surrounds the first display area DA1 and the second display area DA2. More specifically, the first display area DA1 and the second display area DA2 comprise opposing sides S11 and S21 adjacent to each other, and peripheral sides S12 and S22, which are other than the opposing sides S11 and S21. The first sealant SE1 is provided along the peripheral sides S12 and S22 of the first and second display areas DA1 and DA2. The first sealant SE1 is entirely overlaid on the first light shield LS1, adheres the first substrate SUB1 and the second substrate SUB2 each other and seals the liquid crystal layer LC. For example, the first sealant SE1 is formed into a loop shape which continuously goes around without breaking off.

The second sealant SE2 is located between the first display area DA1 and the second display area DA2. The second sealant SE2 is formed to extend linearly along the first direction X. The second sealant SE2 is overlaid on the second light shield LS2 so as to adhere the first substrate SUB1 and the second substrate SUB2 together as in the first sealant SE1. The second sealant SE2 is connected with the first sealant SE1. When the first sealant SE1 and the second sealant SE2 are rendered with a dispenser, the first sealant SE1 and the second sealant SE2 can be drawn with one stroke. The first slit SL1 is located between the first sealant SE1 and the peripheral side S12 of first display area DA1, and between the second sealant SE2 and the opposing side S11 of the first display area DA1. The second slit SL2 is located between the first sealant SE1 and the peripheral side S22 of the second display area DA2, and between the second sealant SE2 and the opposing side S21 of the second display area DA2.

The second sealant SE2 comprises at least one opening OP which communicates the first display area DA1 and the second display area DA2 to each other. In the example illustrated, the second sealant SE2 comprises one opening OP. In the opening OP, the liquid crystal material in the second display area DA2 is allowed to flow into the first display area DA1 or the liquid crystal material in the second display area DA2 is allowed to flow into the first display area DA1. In other words, a first room R1, (see FIG. 10) surrounded by the first substrate SUB1, the second substrate SUB2, the first sealant SE1 and the second sealant SE2, is provided in the first display area DA1. A second room R2 (see FIG. 10), surrounded by the first substrate SUB1, the second substrate SUB2, the first sealant SE1 and the second sealant SE2 is provided in the second display area DA2. Moreover, a communicating channel (opening OP) which communicates the first room R1 and the second room R2 to each other, is formed in the second sealant SE2, and the first room R1, the second room R2 and the communicating channel are filled by the liquid crystal layer LC. Thus, the liquid crystal material of the liquid crystal layer LC can flow from the first room R1 into the second room R2 and also from the second room R2 into the first room R1 via the communicating channel. Note that the shape of the second sealant SE2 is not limited to that of the example illustrated. For example, the second sealant SE2 may be separated from the first sealant SE1.

The first substrate SUB1 includes a mounting portion MA. The IC chip 1 is mounted on the mounting portion MA. The mounting portion MA includes a terminal portion TA for electrically connecting the flexible printed circuit substrate 2 indicated by a dotted line. Note that the IC chip 1 may be mounted on the flexible printed circuit substrate 2.

According to this embodiment, the light shield LS includes the first slit SL1 which surrounds only the first display area DA1 and the second slit SL2 which surrounds only the second display area DA2. That is, parts of the light shield LS, which are located an inner side with respect to the first slit SL1 and an inner side with respect to the second slit SL2, are separated from a part located on an outer side with respect to the first slit SL1 and the second slit SL2. This structure suppresses an application of external static electricity to the display areas DA1, DA2 via the light shield LS at the point of manufacturing or use of the display device DSP. For example, it is possible to inhibit static electricity from being charged on the first display area DA1 or the second display area DA2 during the manufacturing process to cut a large-sized substrate into each individual display panel or inspect the panel. Thus, display defect, which may result from that sort of static-electricity-caused drawback, can be suppressed and deterioration in display quality can be suppressed.

Moreover, the display panel PNL of this embodiment is manufactured, for example, in the following manner. That is, the loop-shaped first sealant SE1 is formed on the first substrate SUB1 and also the linear second sealant SE2 is formed. Then, the liquid crystal material is dropped on an inner side surrounded by the first sealant SE1. After that, the first substrate SUB1 and the second substrate SUB2 are adhered together by the first sealant SE1 and the second sealant SE2. At this time, the first sealant SE1 is overlaid on the first light shield LS1 provided in the second substrate SUB2, and the second sealant SE2 is overlaid on the second light shield LS2 provided in the second substrate SUB2. The amount of the liquid crystal material dropped is determined based on the cell gap between the first substrate SUB1 and the second substrate SUB2, etc. In the step of dropping the liquid crystal material, even if the capacity of each of the first and second display areas DA1 and DA2 (that is, the volume of each room) to the dropping amount at a set value slightly increases or decreases due to individual difference from one display panel PNL to another, the liquid crystal material can flow between the first display area DA1 (first room R1) and the second display area DA2 (second room R2) via the opening OP and thus the volumes of the liquid crystal material in the first display area DA1 and the second display area DA2 can be made even. Therefore, the difference in display quality between the first display area DA1 and the second display area DA2 is reduced. Moreover, the margin of the dropping amount with respect to the set value can be expanded.

Moreover, for example, when a load is applied to the first display area DA1 (first room R1), the liquid crystal material of the first display area DA1 (first room R1) moves (flows out) towards the second display area DA2 (second room R2) via the opening OP. When the load is released, the liquid crystal material of the second display area DA2 (second room R2) flows towards the first display area DA1 (first room R1) via the opening OP. Or, even if the display panel PNL is distorted (like a local shrinkage of the cell gap in the display areas) due to the outflow of the liquid crystal material when a load is applied, the distortion of the display panel PNL is canceled due to the inflow of the liquid crystal material when the load is released, the cell gap is restored to the state before being distorted. Thus, when the load is released, the display state is recovered quickly to the original state.

Further, since the second sealant SE2 is provided between the first display area DA1 and the second display area DA2, an adhesion portion between the first substrate SUB1 and the second substrate SUB2 is formed also in a central portion of the display panel PNL in the display panel as a whole. Therefore, warping of the substrate in the central portion of the display panel PNL(, which is near a section between the first display area DA1 and the second display area DA2) is suppressed. Consequently, the deterioration in display quality can be suppressed.

In this embodiment, as will be described later with respect to FIG. 1, first and second black matrixes BM1 and BM2 are formed respectively in the first and second display areas DA1 and DA2. According to this structure, the display device DSP of this embodiment shown in FIG. 1 comprises an outer light shield ELS, which is an outer side of the first and second slits SL1 and SL2, and an inner light shield ILS, which is an inner side of the first and second slits SL1 and SL2. More specifically, in this embodiment, the inner light shield ILS comprises a first inner light shield ILS1 provided in the first display area DA1 on an inner side of the first slit SL1 and a second inner light shield ILS2 provided in the second display area DA2 on an inner side of the second slit SL2.

The outer light shield ELS includes an outer frame EF provided along the peripheral sides S12 and S22 of the first display area DA1 and the second display area DA2, and an outer bridge EBR provided along the opposing sides S11 and S21 of the first display area DA1 and the second display area DA2. The outer frame EF is provided to cover the first sealant SL1, and the outer bridge EBR is provided to cover the second sealant SL2 and the opening OP.

Moreover, the first inner light shield ILS1 comprises a first frame IF1 provided along the first slit SL1 and a first black matrix BM1 provided in the first frame IF1. The first black matrix BM1 is formed to comprise openings at positions opposing the pixel electrodes of the pixels, and four peripheral sides thereof are connected with the first frame IF1. Similarly, the second inner light shield ILS2 comprises a second inner frame IF2 provided along the second slit SL2 and a second black matrix BM2 provided in the second inner frame IF2. The second black matrix BM2 is formed to comprise openings at positions opposing the pixel electrodes of the pixels, and four peripheral sides thereof are connected with the second inner frame IF2.

Moreover, the first light shield LS1 includes the outer frame EF, a portion of the first inner frame IF1 which corresponds to the peripheral side S12 of the first display area DA1, and a portion of the second inner frame IF2 which corresponds to the peripheral side S22 of the second display area DA2. The second light shield LS2 includes the outer bridge EBR, a portion of the first inner frame IF1 which corresponds to the opposing side S11 of the first display area DA and, a portion of the second inner frame IF2 which corresponds to the opposing side S21 of the second display area DA2. The first slit SL1 and the second slit SL2 are formed across the first light shield LS1 and the second light shield LS2 as described above.

FIG. 2 is a plan view showing a first modified example of the display device DSP.

The configuration example shown in FIG. 2 is different from that of FIG. 1 in that the first slit SL1 surrounds both of the first display area DA1 and the second display area DA2. More specifically, the first slit SL1 includes a first portion SL11 located around the first display area DA1, a second portion SL12 around the second display area DA2 and a third portion SL13 located in the opening OP. The first portion SL11 is provided between the first sealant SE1 and the peripheral side S12 of the first display area DA1 and between the second sealant SE2 and the opposing side S11 of the first display area DA1. The second portion SL12 is provided between the first sealant SE1 and the peripheral side S22 of the second display area DA2 and between the second sealant SE2 and the opposing side S21 of the second display area DA2. The third portion SL13 connects the first portion SL11 and the second portion SL12 with each other is a position overlapping the second light shield LS2. In the light shield LS, the part located on the inner side with respect to the first slit SL1 is separated from the part on an outer side of the first slit SL1.

In such a configuration example as well, an advantageous effect similar to that described above can be obtained.

In this modified example as well, the first and second black matrixes BM1 and BM2 are formed in the respective portions corresponding to the first and second display areas DA1 and DA2. With this structure, the display device DSP of this embodiment shown in FIG. 2 comprises an outer light shield ELS on an outer side of the first slit SL1, and an inner light shield ILS on an inner side of the first slit SL1.

The outer light shield ELS includes the outer frame EF provided along the peripheral sides S12 and S22 of the first display area DA1 and the second display area DA2, and a pair of protruding portions PR protruding from the outer frame EF towards between the opposing sides S11 and S21 of the first display area DA1 and the second display area DA2. The outer frame EF is provided to cover the first sealant SE1 and the protruding portions PR are provided to cover the second sealant SE2.

Moreover, the inner light shield ILS comprises an inner frame IF provided along the first portion SL11, the second portion SL12 and the third portion SL13 of the first slit SL1, a middle portion MD provided to oppose the opening OP and extend from one third portion SL13 to the other third portion SL13. The inner light shield ILS also comprises a first black matrix BM1 provided in the first display area DA1 and a second black matrix BM2 provided in the second display area DA2. The first black matrix BM1 comprises openings at positions opposing the pixel electrodes of the pixels, and four peripheral sides connected with the inner frame IF and the middle portion MD. Similarly, the second black matrix BM2 comprises openings at positions opposing the pixel electrodes of the pixels, and four peripheral sides connected with the inner frame IF and the middle portion MD.

Moreover, the first light shield LS1 includes the outer frame EF, a portion of the inner frame IF, which corresponds to the peripheral side S12 of the first display area DA1, and a portion corresponding to the peripheral side S22 of the second display area DA2. The second light shield LS2 includes the protruding portions PR, the middle portion MD, and a portion of the inner frame IF, which corresponds to the opposing side S11 of the first display area DA1, and a portion of the inner frame IF, which corresponds to the opposing side S21 of the second display area DA2. The first and second slits SL1 and SL2 are formed across the first light shield LS1 and the second light shield LS2.

FIG. 3 is a plan view showing a second modified example of the display device DSP.

The configuration example shown in FIG. 3 is different from that of FIG. 1 in that the first slit SL1 surrounds both of the first display area DA1 and the second display area DA2. The first slit SL1 is formed into a rectangular shape. The first slit SL1 is formed to surround the peripheral side S12 of the first display area DA1 and the peripheral side S22 of the second display area DA2 and to intersect the second sealant SL2. In the light shield LS, the part on the inner side with respect to the first slit SL1 is separated from the part on the outer side of the first slit SL1.

In such a configuration example as well, an advantageous effect similar to that described above can be obtained.

As shown in FIGS. 1 to 3, it suffices if the first slit SL1 surrounds at least the first display area DA1 of the first display area DA1 and the second display area DA2.

In this modified example as well, the first and second black matrixes BM1 and BM2 are formed in the parts corresponding to the first and second display areas DA1 and DA2. With this structure, the display device DSP of this embodiment shown in FIG. 3 includes the outer light shield ELS on an outer side of the first slit SL1, and the inner light shield ILS on an inner side of the first slit SL1.

The outer light shield ELS includes an outer frame EF provided along the peripheral sides S12 and S22 of the first display area DA1 and the second display area DA2. The outer frame EF is provided to cover the first sealant SE1.

Moreover, the inner light shield ILS comprises an inner frame IF provided along the first slit SL1, an inner bridge IBR provided along the opposing sides S11 and S21 of the first display area DA1 and the second display area DA2, and a first black matrix BM1 provided in the first display area DA1 and a second black matrix BM2 provided in the second display area DA2. The first black matrix BM1 is formed to comprise openings at positions opposing the pixel electrodes of the pixels, and four peripheral sides thereof 4 are connected with the inner frame IF and the inner bridge IBR. Similarly, the second black matrix BM2 is formed to comprise openings at positions opposing the pixel electrodes of the pixels, and four peripheral sides thereof are connected with the inner frame IF and the inner bridge IBR.

Moreover, the first light shield LS1 includes the outer frame EF, a portion of the inner frame IF, which corresponds to the peripheral side S12 of the first display area DA1 and a portion corresponding to the peripheral side S22 of the second display area DA2. The second light shield LS2 includes the inner bridge IBR. Further, in this modified example, the first slit SL1 is provided to intersect the second sealant SE2.

FIG. 4 is a diagram illustrating the main configuration of the first substrate SUB1.

The first substrate SUB1 comprises a plurality of scanning lines G1 provided in the first display area DA1, a plurality of scanning lines G2 provided in the second display area DA2, and a plurality of signal lines S provided across the first display area DA1 and the second display area DA2.

The first substrate SUB1 comprises gate drivers GD11 and GD12 provided close to the first display area DA1, and gate drivers GD21 and GD22 provided close to the second display area DA2. The gate drivers GD11 and GD21 are connected to each other via a bus wiring line B1. The gate drivers GD12 and GD22 are connected to each other via a bus wiring line B2. The bus wiring lines B1 and B2 are electrically connected with, for example, the IC chip 1. Each of the bus wiring lines B1 and B2 include, for example, a wire for supplying a start pulse, a wire for supplying a clock, a high-potential power line (VGH), a low-potential power line (VGL) and the like. Of the bus wiring line B1, a portion between a gate driver GD11 and a gate driver GD21 is referred to as a relay portion BR1. Moreover, of the bus wiring line B2, a portion between a gate driver GD12 and a gate driver GD22 is referred to as a relay portion BR2. The relay portions BR1 and BR2 do not include a circuit configuration. Now, the relationship between the first light shield LS1 and the second light shield LS2 shown in FIG. 1 or the like and the gate drivers GD12 and GD22 will be focused. The gate drivers GD12 and GD22 overlap the first light shield LS1. The relay portion BR2 is provided in a connection portion (intersecting portion) between the first light shield LS1 and the second light shield LS2. Near the connection portion, no circuit configurations of the gate drivers GD12 and GD22 are provided. Note that similarly, the relay portion BR1 is provided in the connection portion.

The scanning lines G1 are electrically connected to at least one of the gate drivers GD11 and GD12. The scanning lines G2 are electrically connected to at least one of the gate drivers GD21 and GD22.

The IC chip 1 comprises a display driver DD. The display driver DD outputs signals required for image display, such as video signals to the display panel PNL in an image display mode for displaying images. The signal lines S are electrically connected to the display driver DD. The signal lines S are each electrically connected to the first pixel PX1 and the second pixel PX2.

For example, in the pixel PX1, the first substrate SUB1 comprises a switching element SW1 and a pixel electrode PE1. The switching element SW1 is electrically connected to a scanning line G1 and a signal line S1. The pixel electrode PE1 is electrically connected to the switching element SW1. Moreover, the first substrate SUB1 comprises a common electrode CE1. The common electrode CE1 is shared by a plurality of pixels PX1. Note that the common electrode CE1 may as well be provided in the second substrate SUB2. A capacitance CS1 is formed, for example, between an electrode having the same potential as that of the common electrode CE1 and an electrode having the same potential as that of the pixel electrode PE1. In the first display area DA1, the liquid crystal molecules of the liquid crystal layer LC changes their alignment directions due to an electric field produced between the pixel electrode PE1 and the common electrode CE1.

In the pixel PX2, the substrate SUB1 comprises a switching element SW2 and a pixel electrode PE2. The switching element SW2 is electrically connected to a scanning line G2 and a signal line S. The pixel electrode PE2 is electrically connected to the switching element SW2. Moreover, the first substrate SUB1 comprises a common electrode CE2. The common electrode CE2 is shared by a plurality of second pixels PX2. The common electrode CE2 may be provided in the second substrate SUB2. A capacitance CS2 is formed, for example, between an electrode having the same potential as that of the common electrode CE2 and an electrode having the same potential as that of the pixel electrode PE2. In the second display area DA2, the liquid crystal molecules of the liquid crystal layer LC changes their alignment directions due to an electric field produced between the pixel electrode PE2 and the common electrode CE2. Note that the first pixels PX1 and the second pixels PX2 each comprises a color filter, and these color filters may be provided in the first substrate SUB1 or in the second substrate SUB2.

Figure 5:
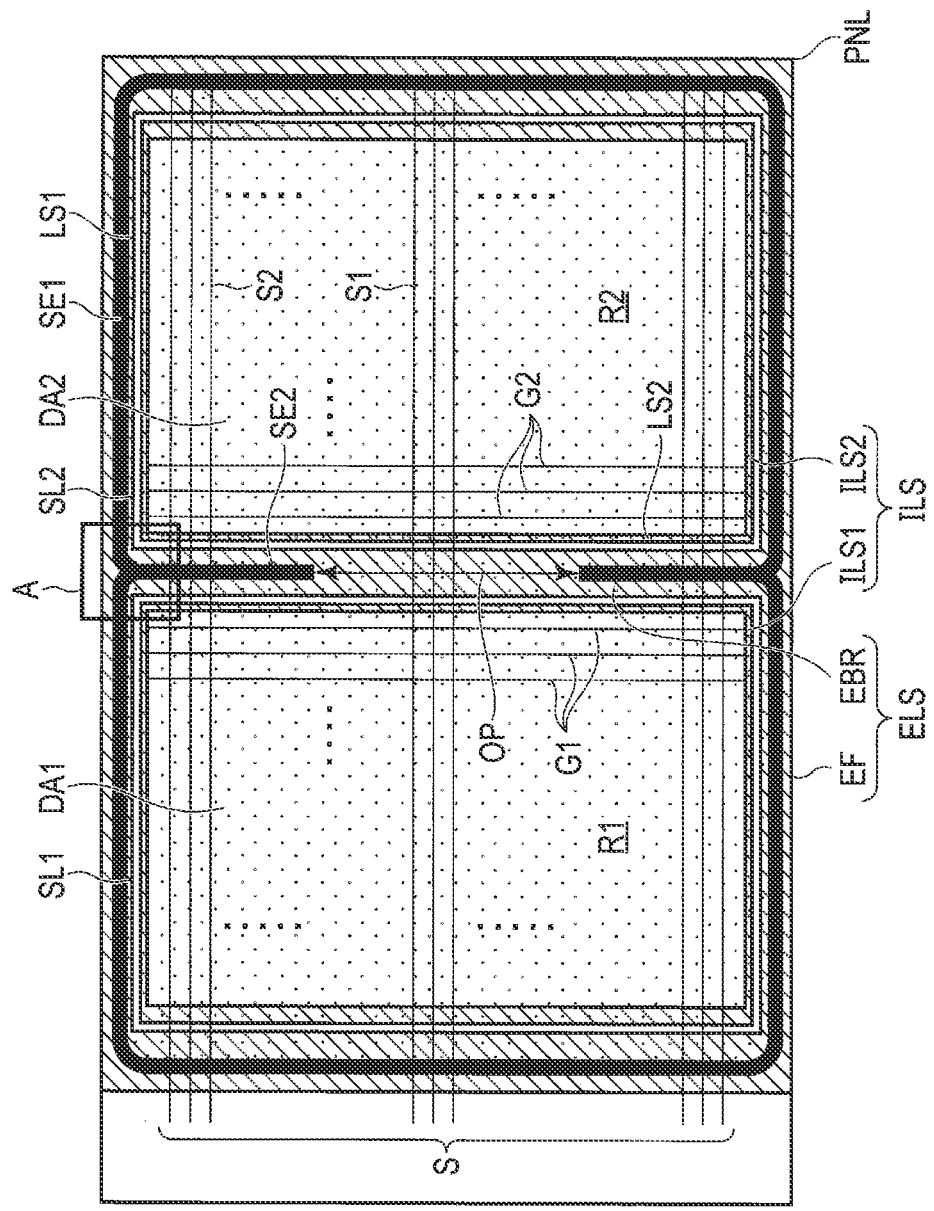
FIG. 5 is a plan view showing the spatial relationship of a signal line, a second sealant, a first slit and a second slit.

FIG. 5 is a plan view showing the spatial relationship between signal lines S, a second sealant SE2, a first slit SL1 and a second slit SL2.

Each of the signal lines S intersects the second light shield LS2 and is provided across the first display area DA1 and second display area DA2 without breaking off. Of the signal lines S, the first signal line S1 overlaps the opening OP of the second sealant SE2 in the second light shield LS2. Moreover, the second signal line S2 intersects the second sealant SE2 in the second light shield LS2. In the example illustrated, the first signal line Si and the second signal line S2 intersect the first slit SL1 and the second slit SL2 in the second light shield LS2.

Note that no scanning lines overlapping the second light shield LS2 and the second sealant SE2 are provided. Or no wiring lines intersecting the signal lines S are provided in the region overlapping the second light shield LS2 or the second sealant SE2.

Figure 6:
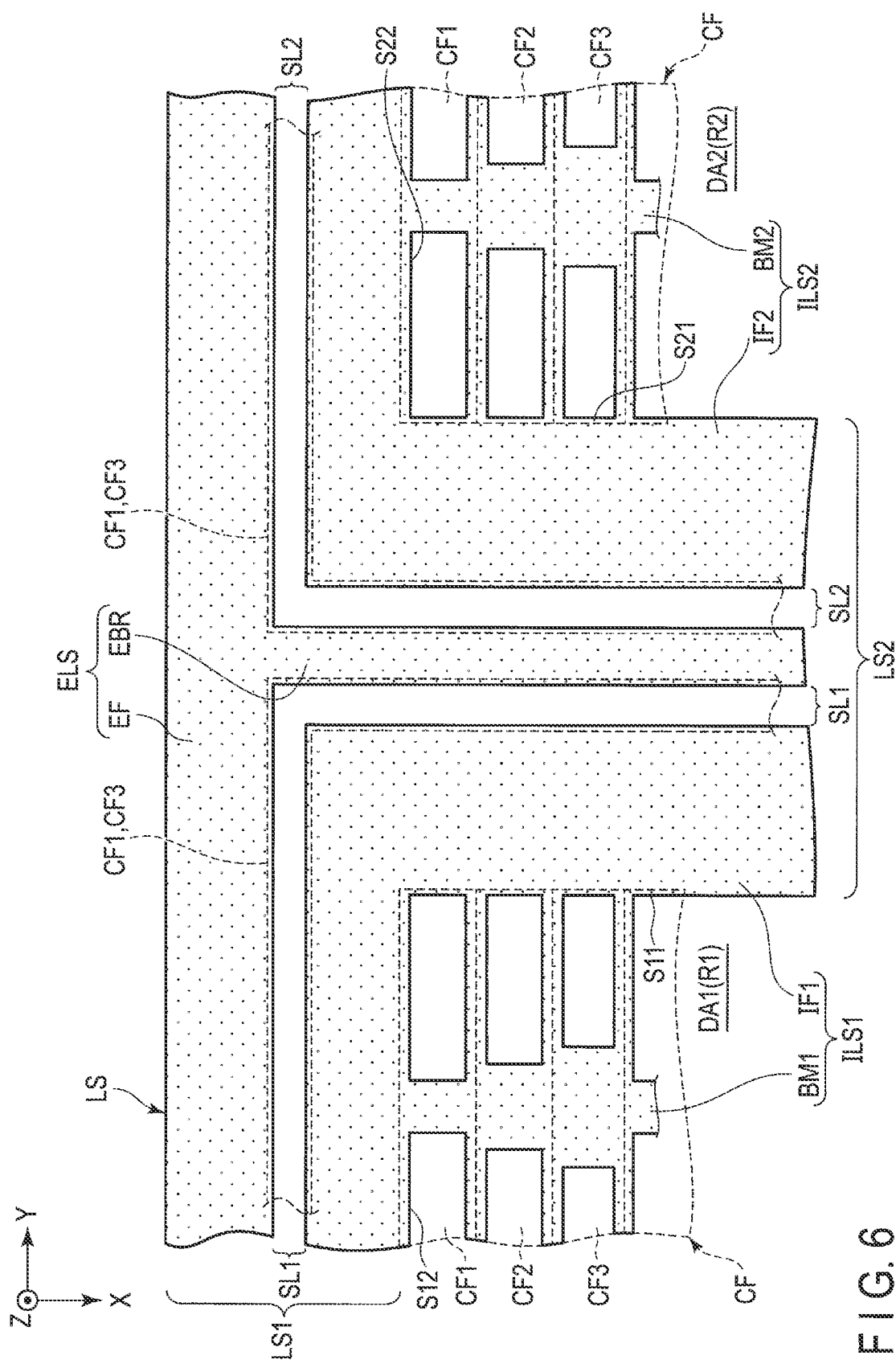
FIG. 6 is an enlarged plan view of an area A shown in FIG. 5.

FIG. 6 is an enlarged plan view of the area A shown in FIG. 5. FIG. 6 is a diagram showing a light shield LS and color filters CF.

In FIG. 6, the light shield LS is indicated by a solid line. The first light shield LS1 is connected to each of the first black matrix BM1 provided in the first display area DA1 and the second black matrix BM2 provided in the second display area DA2. The first and second black matrixes BM1 and BM2 extend along the first direction X. The first black matrix BM1 is provided to overlap the scanning line G1 shown in FIG. 4 or the like. The second black matrix BM2 is provided to overlap the scanning line G2.

The color filter CF comprises color filters CF1, CF2 and CF3. The color filters CF1, CF2 and CF3 are disposed in the first display area DA1 and the second display area DA2 and arranged along with the first direction X to extend out along the second direction Y. The color filters CF1, CF2 and CF3 intersect the first black matrix BM1 in the first display area DA1 and also intersect the second black matrix BM2 in the second display area DA2. The color filters CF1 to CF3 are filters of colors different from each other. For example, the color filter CF1 is a red color filter, the color filter CF2 is a green color filter, and the color filter CF3 is a blue color filter. The color filters CF1 and CF3 are stacked on one another to overlap the first slit SL1 and the second slit SL2. With this structure, the first slit SL1 and the second slit SL2 can remarkably reduce leaking of light.

Figure 7:
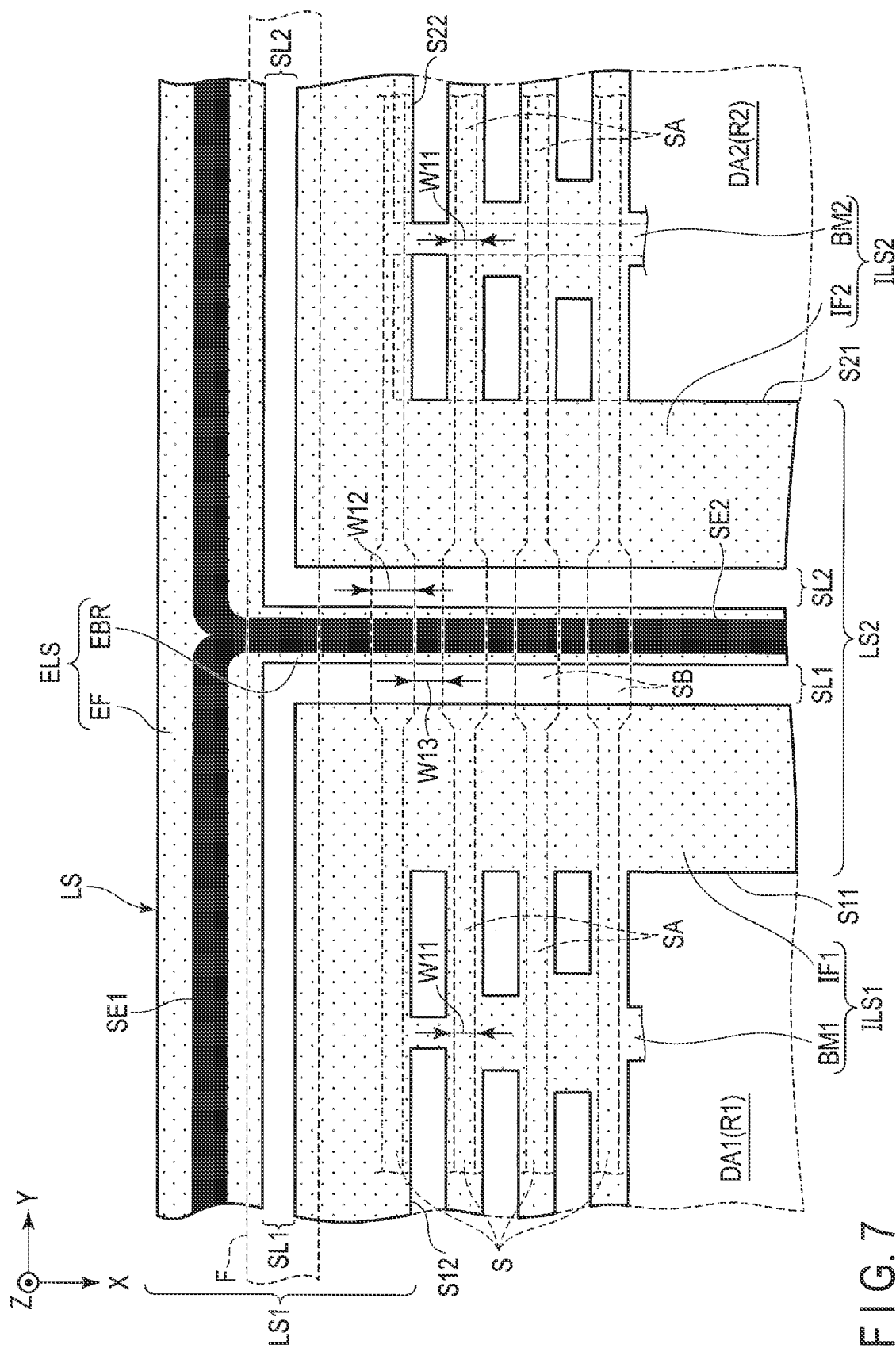
FIG. 7 is an enlarged plan view of the area A shown in FIG. 5.

FIG. 7 is an enlarged plan view of the area A shown in FIG. 5. FIG. 7 illustrates a light shield LS, signal lines S and a feeder line F.

The signal lines S intersect the first black matrix BM1 in the first display area DA1, and then intersects the second light shield LS2, and further intersects the second black matrix BM2 in the second display area DA2. Each signal line S includes a first portion SA which overlaps the first display area DA1 and the second display area DA2 and a second portion SB which overlaps the first slit SL1 and the second slit SL2 between the first display area DA1 and the second display area DA2. The first portion SA has a width (first width) W11 and the second portion SB has a width (second width) W12. The width W12 is greater than the width W11. The second portion SB overlaps the first slit SL1 located between the second sealant SE2 and the first display area DA1 and overlaps the second slit SL2 located between the second sealant SE2 and the second display area DA2. A plurality of second portions SB are arranged to be adjacent to each other with a gap having a width (third width) W13 therebetween. The width W12 is greater than the width W13. That is, the signal lines S are formed to have an expanded line width in a position overlapping the first slit SL1 and the second slit SL2. The signal lines are formed from a metal wire which does not transmit light, and therefore they serve to reduce the light leakage from the first slit SL1 and the second slit SL2.

Moreover, in the signal lines S, the line width is expanded in the second portion SB, thus reducing wiring resistance. Further, as described with reference to FIG. 5, in the region overlapping the second light shield LS2, no wiring lines intersecting the signal line S are provided, therefore the line width of the signal lines S is expanded without a consideration of the signal-line-caused parasitic capacitance.

In the region overlapping the first light shield LS1, the feeder line F is provided to supply a common potential to the first common electrode CE1 and the second common electrode CE2. As will be described later, the feeder line F is provided, for example, in the same layer as that of the signal lines S. The feeder line F is located between the first sealant SE1 and the first display area DA1 and between the first sealant SE1 and the second display area DA2. The feeder line F has light-shielding properties. Further, the feeder line F overlaps the first slit SL1 located between the first sealant SE1 and the first display area DA1 and also overlaps the second slit SL2 located between the first sealant SE1 and the second display area DA2. With this structure, the leakage of light from the first slit SL1 and the second slit SL2 can be reduced.

Figure 8:
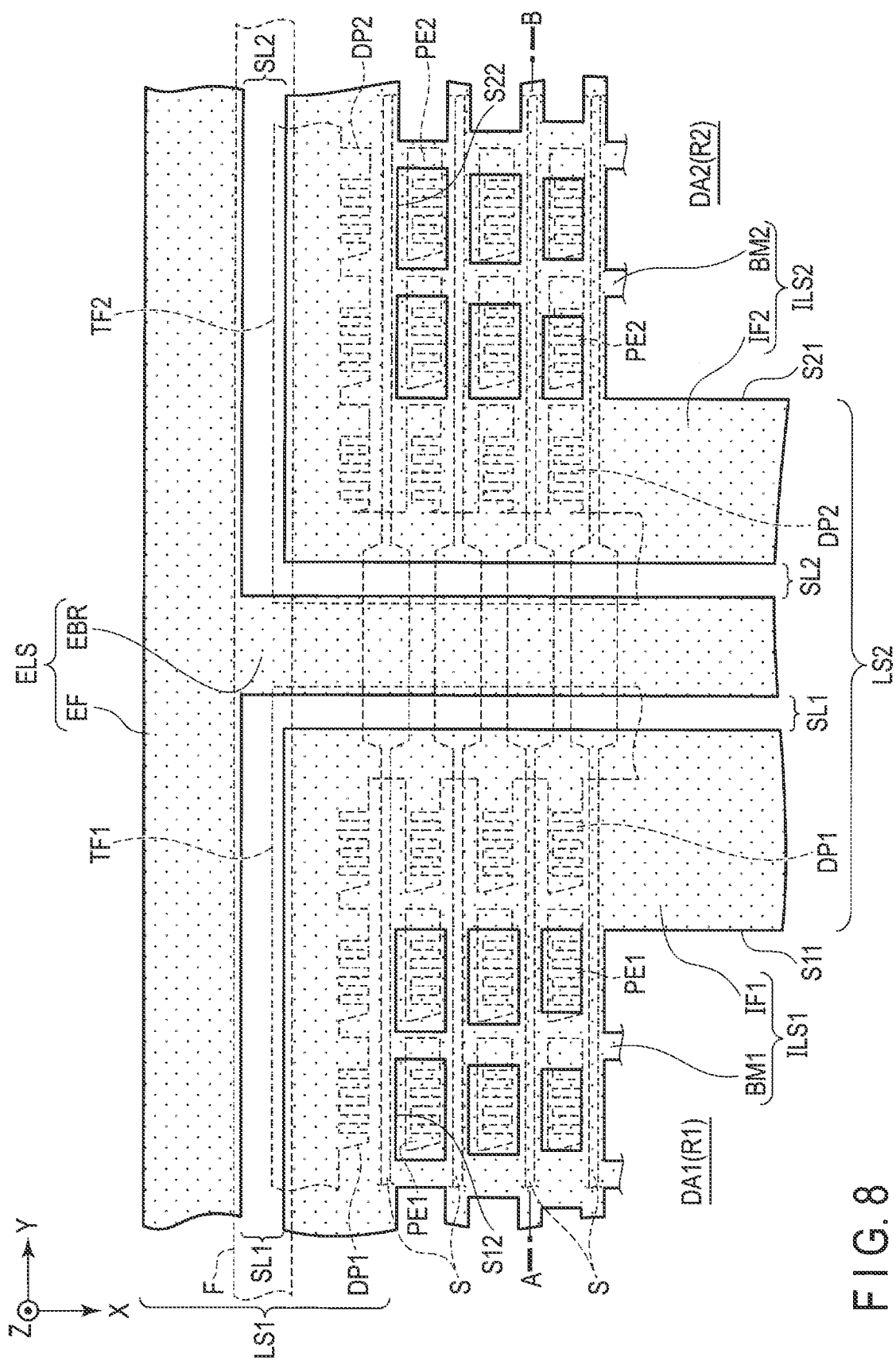
FIG. 8 is an enlarged plan view of the area A shown in FIG. 5.

FIG. 8 is an enlarged plan view of the area A shown in FIG. 5. FIG. 8 illustrates, in addition to the structure shown in FIG. 7, first pixel electrodes PE1, second pixel electrodes PE2, a first peripheral electrode TF1, a second peripheral electrode TF2 and the like.

The first substrate SUB1 comprises a first peripheral electrode TF1, a second peripheral electrode TF2, first pixel electrodes PE1 provided in the first display area DA1, and second pixel electrodes PE2 provided in the second display area DA2. The first peripheral electrode TF1 and the second peripheral electrode TF2 overlap the first light shield LS1 and the second light shield LS2, respectively. The second peripheral electrode TF2 is separated from the first peripheral electrode TF1. The first peripheral electrode TF1 and the second peripheral electrode TF2 each partially overlap the feeder line F. Further, the first peripheral electrode TF1 overlaps the first slit SL1, and the second peripheral electrode TF2 overlaps the second slit SL2.

The first peripheral electrode TF1 is provided around the first display area DA1 and is separated from the first pixel electrode PE1. The first peripheral electrode TF1 includes a dummy pattern DP1 having a shape similar to that of the first pixel electrode PE1 in a side adjacent to the first display area DA1. The dummy pattern DP1 is aligned with the first pixel electrode PE1. That is, in the first direction X, the dummy patterns DP1 are aligned with the first pixel electrodes PE1 located outermost in the first display area DA1. The arrangement along the second direction Y is similarly to this. Thus, the first peripheral electrode TF1 includes a plurality of dummy patterns DP1 formed to correspond to the arrangement of first pixel electrodes PE1 along the peripheral side S12 and the opposing side S11 of the first display area DA1. The second peripheral electrode TF2 is provided around the second display area DA2 and is separated from the second pixel electrode PE2. The second peripheral electrode TF2 includes a dummy pattern DP2 having a shape similar to that of the second pixel electrode PE2 in a side adjacent to the second display area DA2. The relationship between the dummy pattern DP2 and the second pixel electrode PE2 in the second display area DA2 is similar to that of the first display area DA1. The dummy patterns DP1 and DP2 overlap the on first light shield LS1 and the second light shield LS2, respectively.

Moreover, as shown in FIG. 8, the first black matrix BM1 is provided in the first display area DA1. The first black matrix BM1 is formed to extend along the first direction X to cover the scanning line and to extend also along the second direction Y to cover the signal lines S. The first black matrix BM1 has a mesh (or lattice) structure which openings are provided in parts opposing the first pixel electrodes PE1. The second black matrix BM2 has a structure similar to that of the first black matrix BM1.

The sizes of the openings of the first and second black matrixes BM1 and BM2 differ from one pixel to another. More specifically, the distances between the adjacent pixels in the second direction Y, which define widths of the black matrixes BM1 and BM2 in each adjacent pixels (openings), differ from one pixel row to another. By contrast, the width of the second light shield LS2 is sufficiently large as compared to the greatest width of the black matrixes BM1 and BM2, and has a size of about 10 to 200 times as large as the width between the adjacent pixels (or a size equivalent to a total width of about 10 to 200 pixels arranged along the second direction Y). Moreover, the second light shield LS2 includes the first and second slits SL1 and SL2 extending along the first direction X. The first and second slits SL1 and SL2 are formed to have the same width from one side to the other side of the first and second display areas DA1 and DA2, and the length thereof along the first direction X is greater than the length of the first display area DA1 and the second display area DA2 along the first direction X. On the other hand, the first and second black matrixes BM1 and BM2 do not have a slit extending over from one display end to the other side along the first direction X, such as the first and second slits SL1 and SL2.

Figure 9:
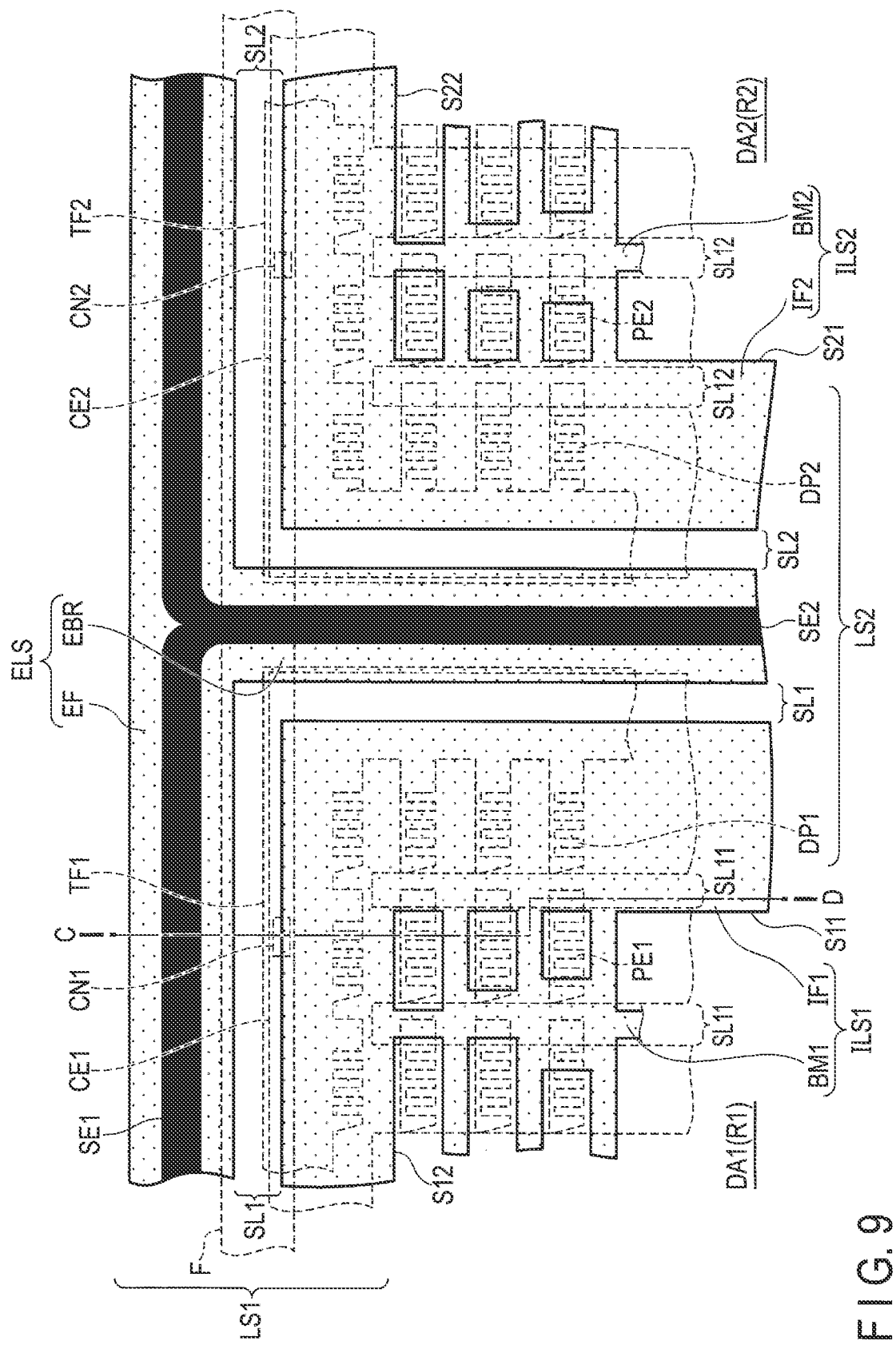
FIG. 9 is an enlarged plan view of the area A shown in FIG. 5.

FIG. 9 is an expanded plan view of the area A shown in FIG. 5. FIG. 9 illustrates, in addition to the structure shown in FIG. 8, a first common electrode CE1, a second common electrode CE2 and the like.

The first common electrode CE1 overlaps the first pixel electrode PE1 in the first display area DA1. The first common electrode CE1 comprises a slit SL11 in the first display area DA1. The slit SL11 is provided so as to overlap the first black matrix BM1. Moreover, the first common electrode CE1 overlaps the first peripheral electrode TF1 including the dummy pattern DP1. The first peripheral electrode TF1 and the first common electrode CE1 overlap the first light shield LS1 and the second light shield LS2. Moreover, the first peripheral electrode TF1 and the first common electrode CE1 overlap the first slit SL1 between the second sealant SE2 and the first display area DA1. In the first connection portion CN1 overlapping the first light shield LS1, the feeder line F, the first common electrode CE1 and the first peripheral electrode TF1 are electrically connected to each other. That is, the first peripheral electrode TF1 is at the same potential as that of the first common electrode CE1.

As described above, in the surroundings of the first display area DA1, the dummy pattern DP of the first peripheral electrode TF1 1 and the first common electrode CE1 overlap each other, and thus they are at the same potential at all times regardless of the display state of the first display area DA1. That is, in a region of the light shield LS, which is particularly close to the first display area DA1, the initial alignment state of the liquid crystal molecules is maintained. In a normally black mode which displays black in the state where there is no potential difference between the first pixel electrode PE1 and the first common electrode CE1, the state where black is displayed is maintained around the first display area DA1. With this structure, the leakage of light from a portion of the first slit SL1, which overlaps the first peripheral electrode TF1 and the first common electrode CE1 can be suppressed.

The second common electrode CE2 is separated from the first common electrode CE1. The second common electrode CE2 overlaps the second pixel electrode PE2 in the second display area DA2. The second common electrode CE2 comprises a slit SL12 in the second display area DA2. The slit SL12 is provided so as to overlap the second black matrix BM2. Moreover, the second common electrode CE2 overlaps the second peripheral electrode TF2 including the dummy pattern DP2. The second peripheral electrode TF2 and the second common electrode CE2 overlap the first light shield LS1 and the second light shield LS2. Moreover, the second peripheral electrode TF2 and the second common electrode CE2 overlap the second slit SL2 between the second sealant SE2 and the second display area DA2. In the second connection portion CN2 overlapping the first light shield LS1, the feeder line F, the second common electrode CE2 and the second peripheral electrode TF2 are electrically connected to each other. In the surroundings of the second display area DA2 as well, the dummy pattern DP2 of the second peripheral electrode TF2 and the second common electrode CE2 overlap each other. Thus, they are at the same potential, and the liquid crystal molecules are maintained in the initial alignment state. That is, the state where black is displayed is maintained also around the second display area DA2. Therefore, the leakage of light from a portion of the second slit SL2, which overlaps the second peripheral electrode TF2 and the second common electrode CE2 can be suppressed.

Figure 10:
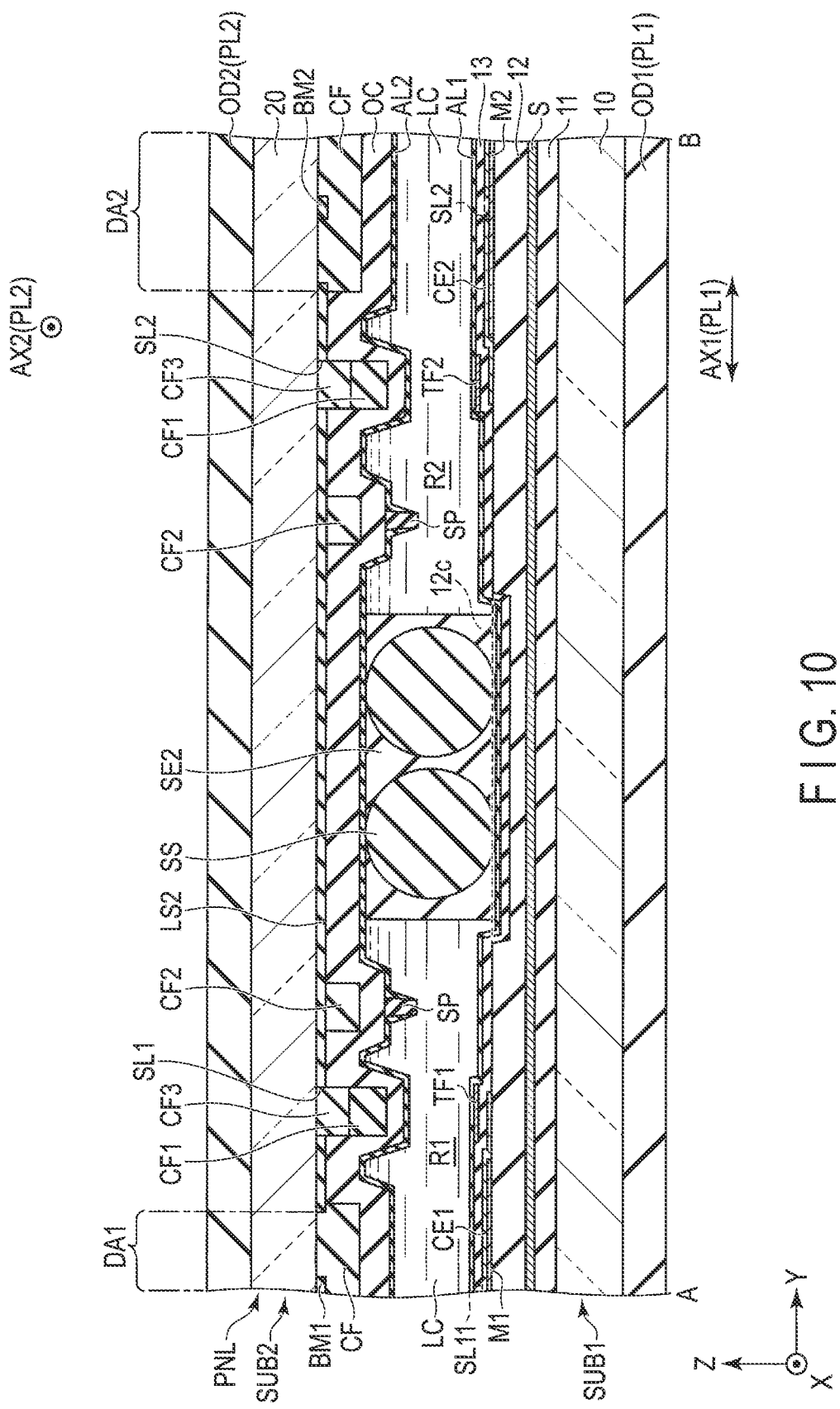
FIG. 10 is a cross section of a display panel taken along line A-B line on the signal line shown in FIG. 8.

FIG. 10 is a cross section of the display panel PNL taken along line A-B on the signal line S shown in FIG. 8.

The first substrate SUB1 comprises a insulating substrate 10, insulating films 11 to 13, a signal line S, metallic wiring lines M1 and M2, a first common electrode CE1, a second common electrode CE2, a first peripheral electrode TF1, a second peripheral electrode TF2, an alignment film AL1 and the like. Note that the scanning lines G1 and G2 and the switching elements SW1 and SW2 shown in FIG. 4 are formed between the insulating substrate 10 and the insulating film 11. The signal line S is provided between the insulating films 11 and 12. The metallic wiring lines M1 and M2 are formed between the insulating films 12 and 13. Note that FIGS. 8 and 9 do not illustrate the metallic wiring lines M1 and M2, but the metallic wiring lines M1 and M2 are provided to extend along the second direction Y and overlap the signal line S. The metallic wiring line M1 intersects the slit SL11 and is in contact with the first common electrode CE1. With this structure, first common electrodes CE1 arranged along the second direction Y with the slit SL11 therebetween are electrically connected to each other by the metallic wiring line M1, and thus the resistance of the first common electrodes CE1 is lowered. In the slit SL11, the insulating film 13 covers the metallic wiring line M1. Moreover, the metallic wiring line M2 intersects the slit SL12, and is in contact with the second common electrode CE2. With this structure, second common electrodes CE2 arranged along the second direction Y are electrically connected to each other by the metallic wiring line M2, and thus the resistance of the second common electrode CE2 is lowered. In the slit SL12, the insulating film 13 covers the metallic wiring line M2. The metallic wiring lines M1 and M2 overlap the same signal line S, but they are broken off between the first display area DA1 and the second display area DA2. Note that such a structure may be adopted that the metallic wiring lines M1 and M2 are connected to each other (to form one metallic wiring as a result of being connected together).

The first peripheral electrode TF1 and the second peripheral electrode TF2 are provided between the insulating film 13 and the alignment film AL1. In the cross section shown in FIG. 10, the insulating film 13 is interposed between the first common electrode CE1 and the first peripheral electrode TF1 and between the second common electrode CE2 and the second peripheral electrode TF2.

The second substrate SUB2 comprises an insulating substrate 20, first and second black matrixes BM1 and BM2, a second light shield LS2, color filters CF1, CF2 and CF3, an overcoat layer OC, an alignment film AL2, spacers SP and the like. The color filters CF3 are located respectively in the first slit SL1 and the second slit SL2, and the color filters CF1 are stacked on the color filters CF3 in positions overlapping the first slit SL1 and the second slit SL2, respectively. The color filters CF1 and CF3, which are of different colors, overlap each other along the third direction Z, and thus the leakage of light from the first slit SL1 and the second slit SL2 can be suppressed. Note that one- or three-layered structure can be adopted for the color filters CF which overlap the first and second slits SL1 and SL2. Or, for the two-layer structure, a combination other than that shown in FIG. 10 can as well be employed. Moreover, a color filter CF2 is located in a position overlapping the spacer SP to adjust the height of the spacer SP. Naturally, such a structure can be adopted as well that the color filters CF1 and CF3 are employed in place of the color filter CF2 or some of these color filters are stacked on one another.

The insulating substrates 10 and 20 are transparent glass substrates or resin substrates. The insulating films 11 and 13 are transparent inorganic insulating films. The insulating film 12 and the overcoat layer OC are transparent organic insulating films. The signal line S and the metallic wiring lines M1 and M2 are formed of an opaque metal material. The first common electrode CE1, the second common electrode CE2, the first peripheral electrode TF1 and the second peripheral electrode TF2 are formed from a transparent conductive material.

The second sealant SE2 is provided between the first common electrode CE1 and the second common electrode CE2 directly under the second light shield LS2. Or the second sealant SE2 is provided between the first peripheral electrode TF1 and the second peripheral electrode TF2. As described above, the second sealant SE2 contains in-sealant spacers SS (or may be referred to as fillers). The second sealant SE2 is in contact with each of the alignment films AL1 and AL2. Note that the particle diameter of the filler can be selected as needed. Naturally, the employable particle diameter may be equivalent to or less than that of a gap (or also referred to as cell gap) between the first substrate SUB1 and the second substrate SUB2, or particle diameters. Moreover, a sealant which does not contain any filler is also employable.

In the example shown in FIG. 10, the insulating film 12 comprises a concavity 12C between the first display area DA1 and the second display area DA2. That is, the insulating film 12 is partially thinned. The second sealant SE2 is provided so as to overlap the concavity 12C. With this structure, when the second sealant SE2 is formed, spreading of the sealant over to the first display area DA1 and the second display area DA2 is suppressed. Moreover, if a load is applied to a central portion of the display panel PNL, displacement of the second sealant SE2 towards a first display area DA1 side or towards a second display area DA2 is suppressed. Moreover, the signal lines S pass through the lower portion of the second sealant SE2 from the first display area DA1 towards the second display area DA2.

The first optical element OD1 is adhered to the insulating substrate 10, and the second optical element OD2 is adhered to the insulating substrate 20. Each of the first optical element OD1 and the second optical element OD2 may comprise at least a first polarizer PL1 and a second polarizer PL2, and may include a retardation film or the like as needed. A first polarization axis AX1 of the first polarizer PL1 and a second polarization axis AX2 of the second polarizer PL2 are at cross-Nicol. At the liquid crystal is OFF, the light penetrating the first polarizer PL1 and entering the display panel PNL is linearly polarized light normal to the first polarization axis AX1. The polarization state of the linearly polarized light substantially does not vary when the light passes through the liquid crystal layer LC when off. Therefore, the linearly polarized light which passes through the display panel PNL is absorbed by the second polarizer PL2 which is in a cross-Nicol relationship with the first polarizer PL1. Thus, as described above, in a position which overlaps the first peripheral electrode TF1 and the second peripheral electrode TF2, a black display can be realized and the leakage of light from the first slit SL1 and the second slit SL2 can be suppressed. Even if the metallic wiring lines and the like, have a light-shielding effect cannot be arranged in positions overlapping the first slit SL1 or the second slit SL2 for reason of layout, the light-shielding can be achieved by the first peripheral electrode TF1 and the second peripheral electrode TF2. Moreover, even if the color filters CF1 and CF3 stacking one on another cannot perfectly achieve the shielding of light, the leakage of light from the first slit SL1 and the second slit SL2 can be suppressed by the first peripheral electrode TF1 and the second peripheral electrode TF2.

Figure 11:
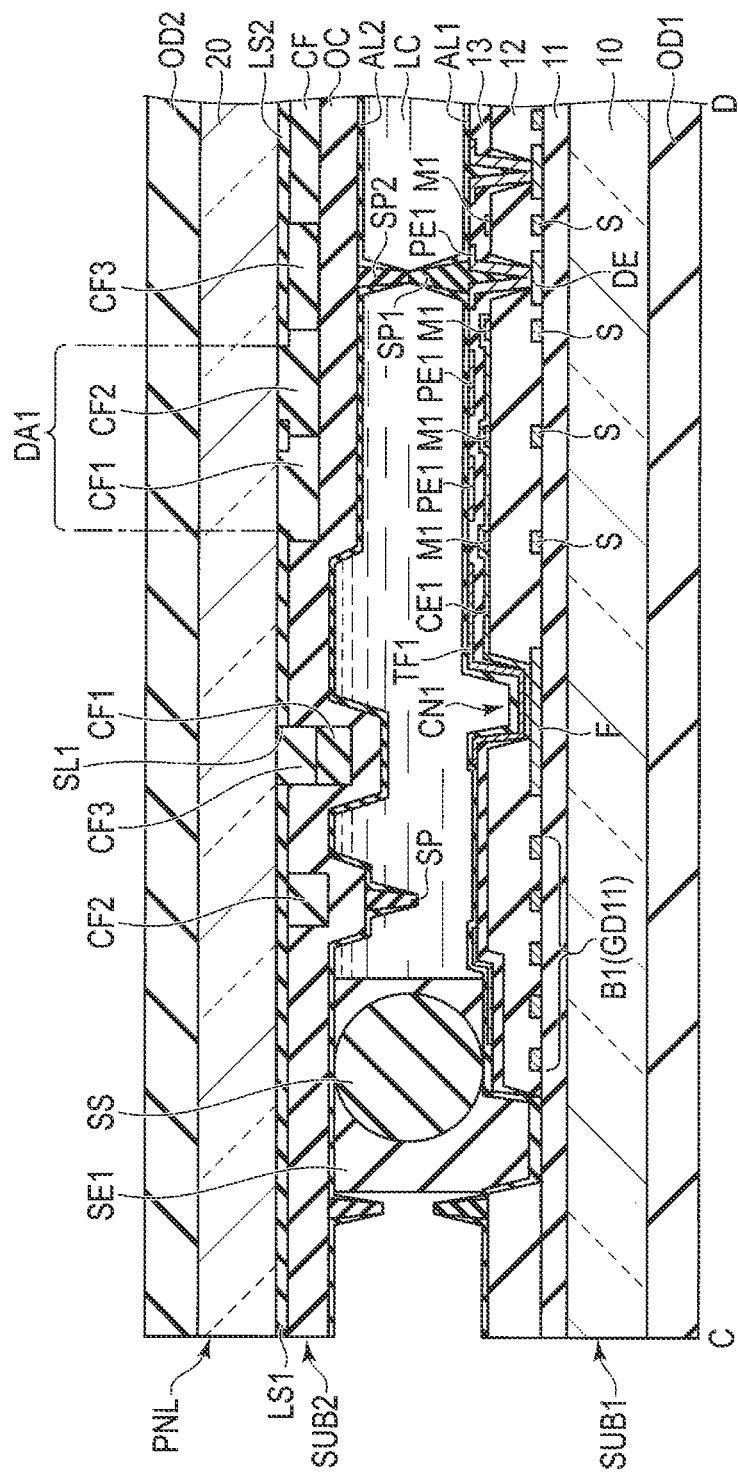
FIG. 11 is a cross section of the display panel PNL taken along line C-D shown in FIG. 9.

FIG. 11 is a cross section showing the display panel PNL taken along line C-D shown in FIG. 9.

In the first substrate SUB1, a drain electrode DE of a switching element, a feeder line F and bus wiring lines B1 are formed between the insulating films 11 and 12 as in the case of the signal lines S. The metallic wiring lines M1 are formed so as to overlap the signal lines S, respectively. The first common electrode CE1 is in contact with the feeder line F so as to electrically connect them to each other in the first connection portion CN1. The first peripheral electrodes TF1 are in contact with the first common electrode CE1 so as to be electrically connected to each other in the first connection portion CN1. The first pixel electrodes PE1 are provided between the insulating film 13 and the alignment film AL1 as in the case of the first peripheral electrode TF1. Note that in the second display area DA2 (not shown), the second pixel electrodes PE2 are provided between the insulating film 13 and the alignment film AL1. The first pixel electrode PE1 and the second pixel electrode PE2 are formed from the same transparent conductive material as that of the first peripheral electrode TF1. The first pixel electrodes PE1 are brought into contact with the drain electrode DE of the switching element so as to electrically connect them to each other. The first spacer SP1 is provided in the connection portion between the first pixel electrodes PE1 and the drain electrode DE.

In the second substrate SUB2, the first light shield LS1 is provided between the insulating substrate 20 and the overcoat layer OC as in the case of the second light shield LS2. The color filter CF partially overlaps the second light shield LS2. The second spacer SP2 is provided to be in contact with the first spacer SP1. The first spacer SP1 and the second spacer SP2 form the cell gap.

The first sealant SE1 is provided directly under the first light shield LS1, so as to be in contact with each of the alignment films AL1 and AL2. The first sealant SE1 contains an in-sealant spacer SS as in the case of the second sealant SE2. The color filters CF1 and CF3 and the feeder line F are located in positions overlapping the first slit SL1 of the light shield LS. With such a configuration that these members overlap each other, the leakage of light from the first slit SL1 can be significantly suppressed.

As described above, according to the embodiment, in the display panel PNL comprising two displays, the first and second display area DA1 and DA2, the light shield LS is provided across the first and second display areas DA1, and the first and second slits SL1 and SL2, which surround the first and second display areas DA1 and DA2, respectively, and also the slit (first slit SL1) which collectively surrounds both of the first and second display areas DA1 and DA2 are provided in the light shield LS. With this structure, it is possible to suppress static electricity from reaching each of the first and second display areas DA1 and DA2 via the light shield LS. Thus, a display device which can suppress deterioration of display quality can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. For example, such a configuration that comprises a third display area can be adopted as well. The accompanying claims and their equivalents are intended to cover such forms or modified examples as would fall within the scope and spirit of the inventions.

What is claimed is:

1. A display device comprising:
a first display area in which a first pixel is provided;
a second display area in which a second pixel is provided, the second display area provided next to the first display area;
a light shield surrounding the first display area and the second display area separately,
a first slit provided in the light shield,
a first sealant surrounding the first display area and the second display area; and
a second sealant located between the first display area and the second display area, wherein
the second sealant comprises at least one opening which communicates the first display area and the second display area to each other, and
the first slit is provided along an outer circumference of the first display area and an outer circumference of the second display area, and overlaps a base end of the second sealant which is connected with the first sealant.

2. The display device of claim 1, wherein
the first slit is located between an inner edge of the light shield and the first sealant in a plan view.

3. The display device of claim 1, wherein
the light shield comprises an outer frame which is a portion outside of the first slit, an inner frame which is a portion inside of the first slit, and an inner bridge which connects the inner frame and overlaps the second sealant.

4. The display device of claim 3, wherein
the first slit extends along a base end of the inner bridge.

5. The display device of claim 1, wherein
the first slit completely encloses the first display area and the second display area without any breaks.

6. The display device of claim 1, further comprising:
a feeder having light-shielding property between the first sealant and the first display area; wherein
the feeder overlaps the first slit located between the first sealant and the first display area.

7. The display device of claim 6, further comprising: a pixel electrode provided in the first display area;
a peripheral electrode provided in a circumference of the first display area and separated from the pixel electrode; and
a common electrode overlapping both of the pixel electrode and the peripheral electrode, wherein
the peripheral electrode and the common electrode are electrically connected to the feeder, and overlap the first slit between the second sealant and the first display area.

8. The display device of claim 1, further comprising:
a first color filter and a second color filter stacking on the first slit, wherein
a color of the first color filter is different from a color of the second color filter.

9. The display device of claim 1, further comprising:
a first polarizer and a second polarizer, wherein
a first polarization axis of the first polarizer and a second polarization axis of the second polarizer are at cross-Nicol.

10. The display device of claim 1, further comprising:
a plurality of signal lines provided continuously across the first display area and the second display area, wherein
each of the signal lines includes a first portion having a first width and overlapping the first display area, and a second portion having a second width and overlapping the first slit between the first display area and the second display area, and
the second width is greater than the first width.

11. The display device of claim 10, wherein
a plurality of second portions are located next to each other with a gap having a third width there between, and
the second width is greater than the third width.

* * * * *